(No Model.)
H. LAHANN.
RELEASING DEVICE.
No. 519,815.                                     Patented May 15, 1894.
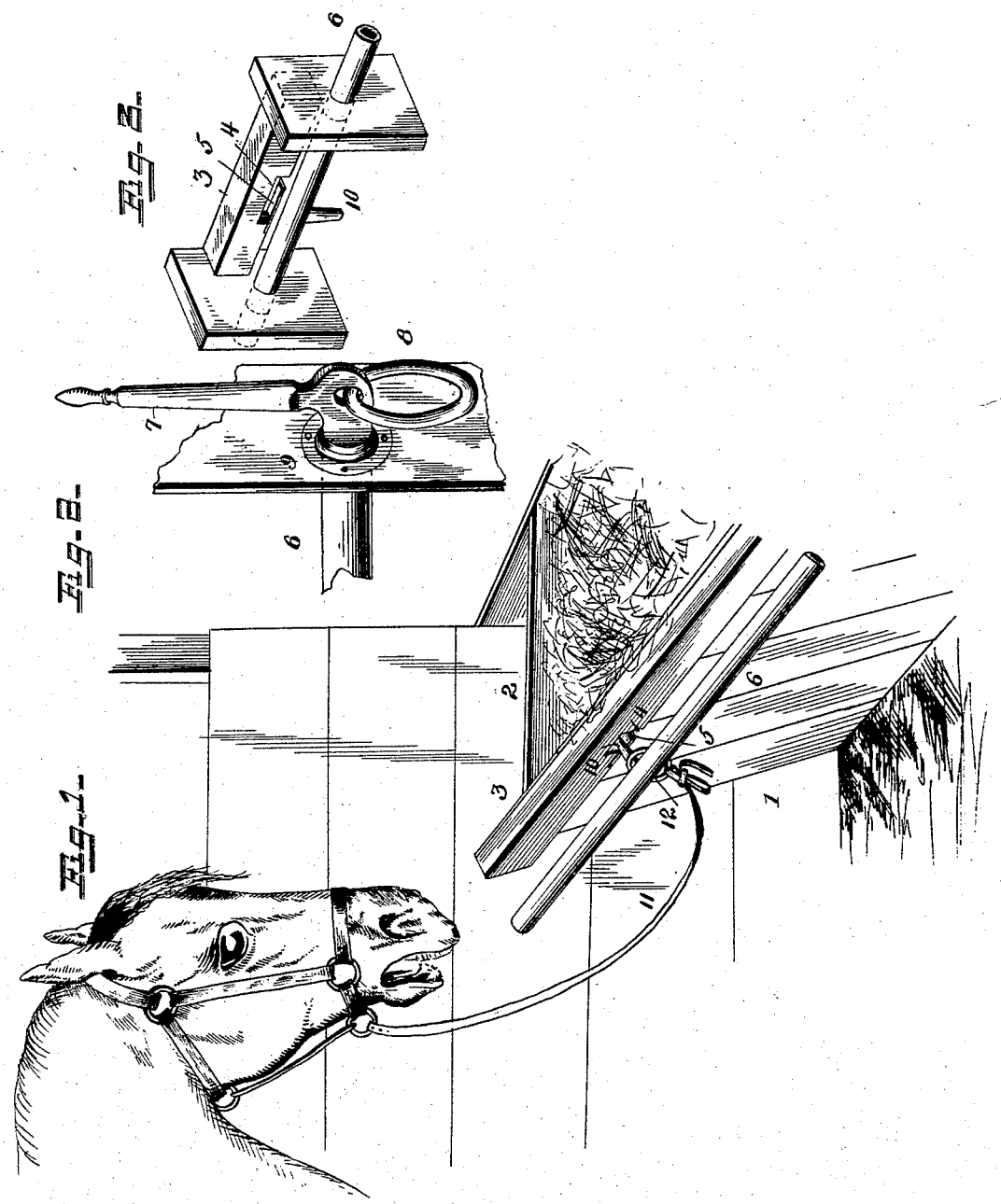
Witnesses
Inventor
Henry Lahann
By his Attorney
John Wedderburn

UNITED STATES PATENT OFFICE.

HENRY LAHANN, OF TRAVER, CALIFORNIA.

RELEASING DEVICE.

SPECIFICATION forming part of Letters Patent No. 519,815, dated May 15, 1894.

Application filed September 23, 1893. Serial No. 486,275. (No model.)

*To all whom it may concern:*

Be it known that I, HENRY LAHANN, a citizen of the United States, and a resident of Traver, in the county of Tulare and State of California, have invented certain new and useful Improvements in Releasing Devices for Animals; and I do hereby declare the following to be a full, clear, and exact description of the invention, such as will enable others skilled in the art to which it appertains to make and use the same.

This invention relates to devices for releasing horses or other stock in a stable or other place, and it has for its object to afford means wherein one horse or a line of horses or other stock may be unfastened in their stalls simultaneously in order to turn the horses or stock loose in case of fire or for other purposes.

With this and other objects in view, the invention consists of the construction and arrangement of the several parts which will be more fully hereinafter described and claimed.

In the drawings: Figure 1 is a perspective view of a portion of a stall and manger showing a horse attached to the improved device. Fig. 2 is a perspective view of the end of the operating shaft and lever and ring therefor. Fig. 3 is a perspective view of a portion of the front of the manger and the sides of the stall.

Similar numerals of reference are employed to indicate corresponding parts in the several views.

Referring to the drawings, the numeral 1, designates a stall having therein a suitable form of manger 2, with an upper sill 3. The said sill 3, as shown in Figs. 1 and 3 is formed with an opening 4, which extends through the bottom edge of said sill and is partially covered by a metallic plate 5. Slightly in advance of the said sill 3, is a solid or tubular rod, bar, or pipe 6, which serves and may be of any length desired in order to either extend through a single stall or a series of the same, and is supplied at one or both ends thereof with an operating lever 7, and a pull ring 8. At the point where the said shaft passes through the last partition on either end a suitable bearing 9 is secured in place. At regular intervals along the length of the shaft 6, are located pins 10, which extend at an upward inclination and are adapted to pass in through the bottom portion of the opening 4, and be held on top of the plate 5, in the construction shown by Figs. 1 and 3. In this arrangement of parts, the said shaft is adapted to be slid longitudinally in its bearings through the medium of the lever 7, and the ring 8, in order to make a proper connection with the opening 4, and to engage the plate 5, as shown in Fig. 1, and when a disengagement of the said pin from the opening 4, and the plate 5, is accomplished, the shaft is moved toward the free end of the said plate 5, where an entrance is provided with the adjacent wall of the said opening 4, to permit the pin to pass out and be turned in the position shown by Fig. 3, which is accomplished by rotating the lever 7. The halter strap 11, is attached to a ring 12, which is caused to engage the said pin 10, and when in the position shown in Fig. 1, it is impossible for the animal to disengage himself, but as shown in Fig. 3, it will be seen that the ring is permitted to drop off from the pin and thereby unfasten the said halter strap and allow the animal to have freedom.

If the animal should be pulling at the time a disconnection of the ring is desired, the shaft may be turned still farther around so that the pull of the animal will be sure to loosen the ring on the pin.

It is obviously apparent that many minor changes in the construction and operation of the several parts in addition to those already described might be made and substituted without in the least departing from the nature or spirit of the invention.

Having thus described the invention, what is claimed as new is—

In a device of the character set forth, the combination of a rotatable longitudinally movable shaft having a pin in connection therewith with one end left projecting therefrom, a sill having an opening in the under edge thereof to receive the projecting end of the pin and a plate on the under side of the sill which partially closes the opening therein and holds the pin in place until the shaft is moved longitudinally, substantially as described.

In testimony whereof I have signed this specification in the presence of two subscribing witnesses.

HENRY LAHANN.

Witnesses:
HARRY HURST,
P. J. DOODEY.